United States Patent
Kashiwagi

(10) Patent No.: US 7,050,572 B2
(45) Date of Patent: May 23, 2006

(54) TELEPHONE SET AND RESPONSE METHOD TO INCOMING CALL

(75) Inventor: Koichiro Kashiwagi, Tokyo (JP)

(73) Assignee: NEC Corporation (JP)

( * ) Notice: Subject to any disclaimer, the term of this patent is extended or adjusted under 35 U.S.C. 154(b) by 356 days.

(21) Appl. No.: 09/859,652

(22) Filed: May 17, 2001

(65) Prior Publication Data

US 2001/0043699 A1   Nov. 22, 2001

(30) Foreign Application Priority Data

May 18, 2000   (JP)   ............................. 2000-145818

(51) Int. Cl.
*H04M 1/00* (2006.01)
*H04M 3/00* (2006.01)

(52) U.S. Cl. ............................. 379/373.01; 379/67.1; 379/68; 379/72; 379/80

(58) Field of Classification Search .... 379/67.1–88.27, 379/373.01
See application file for complete search history.

(56) References Cited

U.S. PATENT DOCUMENTS

| | | | |
|---|---|---|---|
| 5,652,789 A * | 7/1997 | Miner et al. ........... | 379/201.01 |
| 5,745,562 A * | 4/1998 | Penning ................. | 379/215.01 |
| 5,883,891 A * | 3/1999 | Williams et al. ............ | 370/356 |
| 6,016,343 A | 1/2000 | Hogan et al. ................ | 379/242 |
| 6,021,181 A * | 2/2000 | Miner et al. ............. | 379/88.23 |
| 6,038,305 A | 3/2000 | McAllister et al. ......... | 379/207 |
| 6,385,303 B1 * | 5/2002 | Peterson et al. ........... | 379/67.1 |
| 6,396,531 B1 * | 5/2002 | Gerszberg et al. ....... | 348/14.01 |
| 6,404,863 B1 * | 6/2002 | Beamish .................. | 379/93.35 |
| 6,633,635 B1 * | 10/2003 | Kung et al. ............ | 379/215.01 |
| 2002/0009073 A1 * | 1/2002 | Furukawa et al. .......... | 370/352 |
| 2003/0068020 A1 * | 4/2003 | Hamrick et al. ......... | 379/88.21 |

FOREIGN PATENT DOCUMENTS

| | | |
|---|---|---|
| JP | 06-141073 | 5/1994 |
| JP | 2000-236356 | 8/2000 |

* cited by examiner

*Primary Examiner*—Sinh Tran
*Assistant Examiner*—Ramnandan Singh
(74) *Attorney, Agent, or Firm*—Hayes Soloway P.C.

(57) ABSTRACT

A telephone set is provided that includes a control section that, when detecting an off-hook operation, instructs a tone generator and a codec to stop a transmission of an incoming call and simultaneously instructs, using an awaiting voice generation instructing function section, the tone generator to produce a signal voice informing an awaiting state and the codec to transmit it to a handset. At the same time, the control section generates an off-hook signal and transmits it to a packeting section. The off-hook signal is incorporated in the packet to be transmitted by the packeting section and is transmitted from a packet network interface to a packet network.

16 Claims, 4 Drawing Sheets

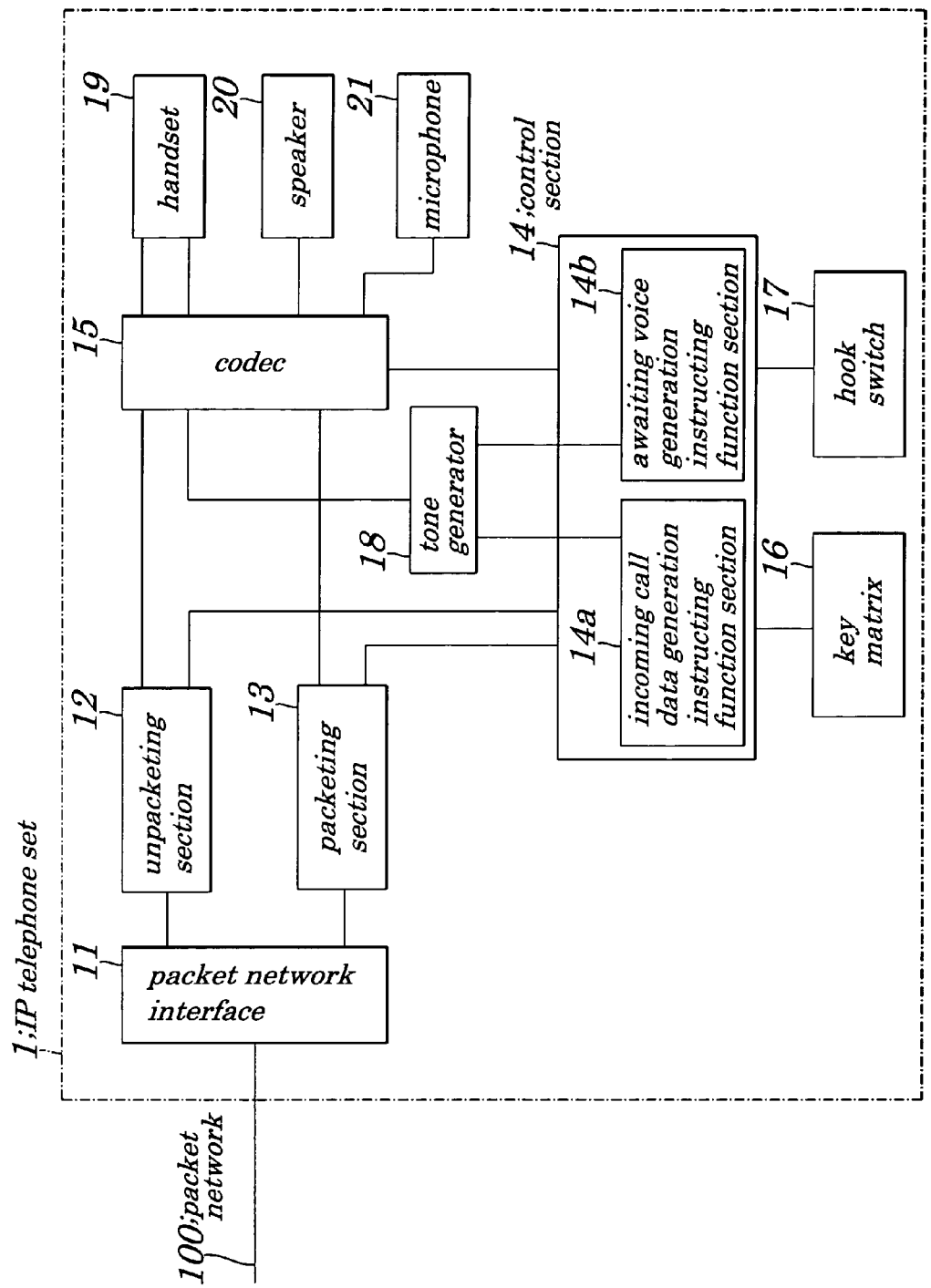

[FIG.2]
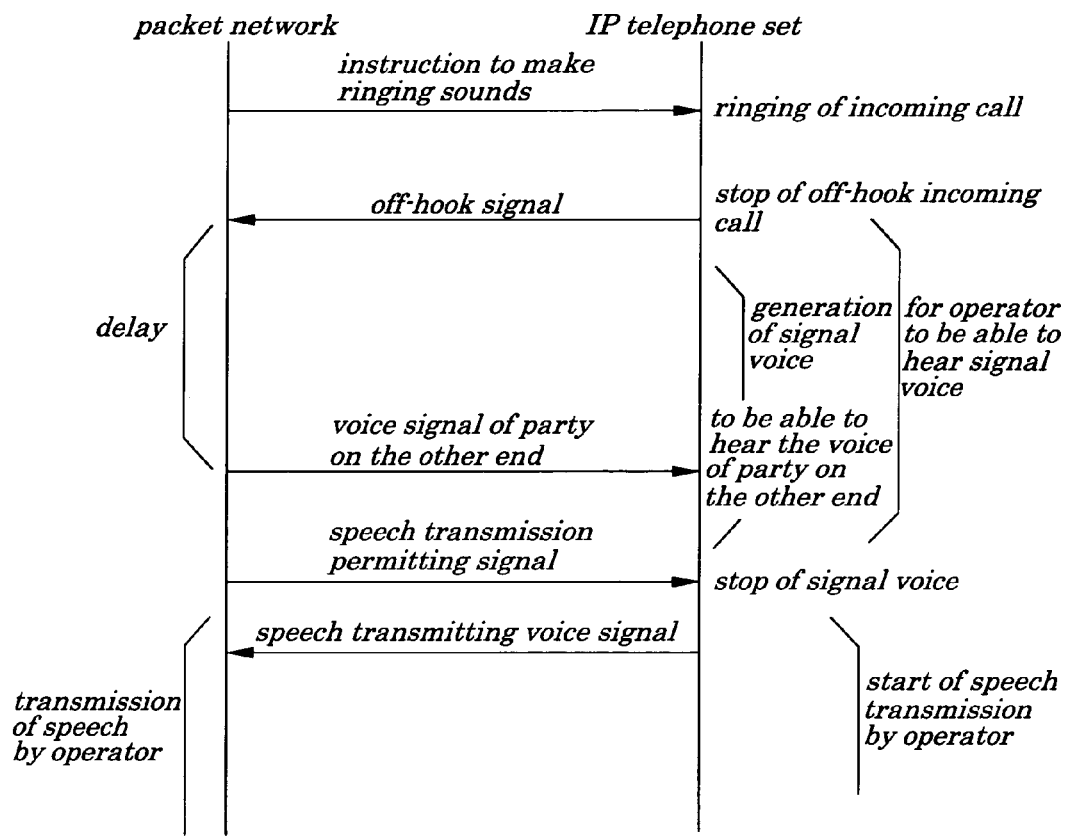

[FIG.3]
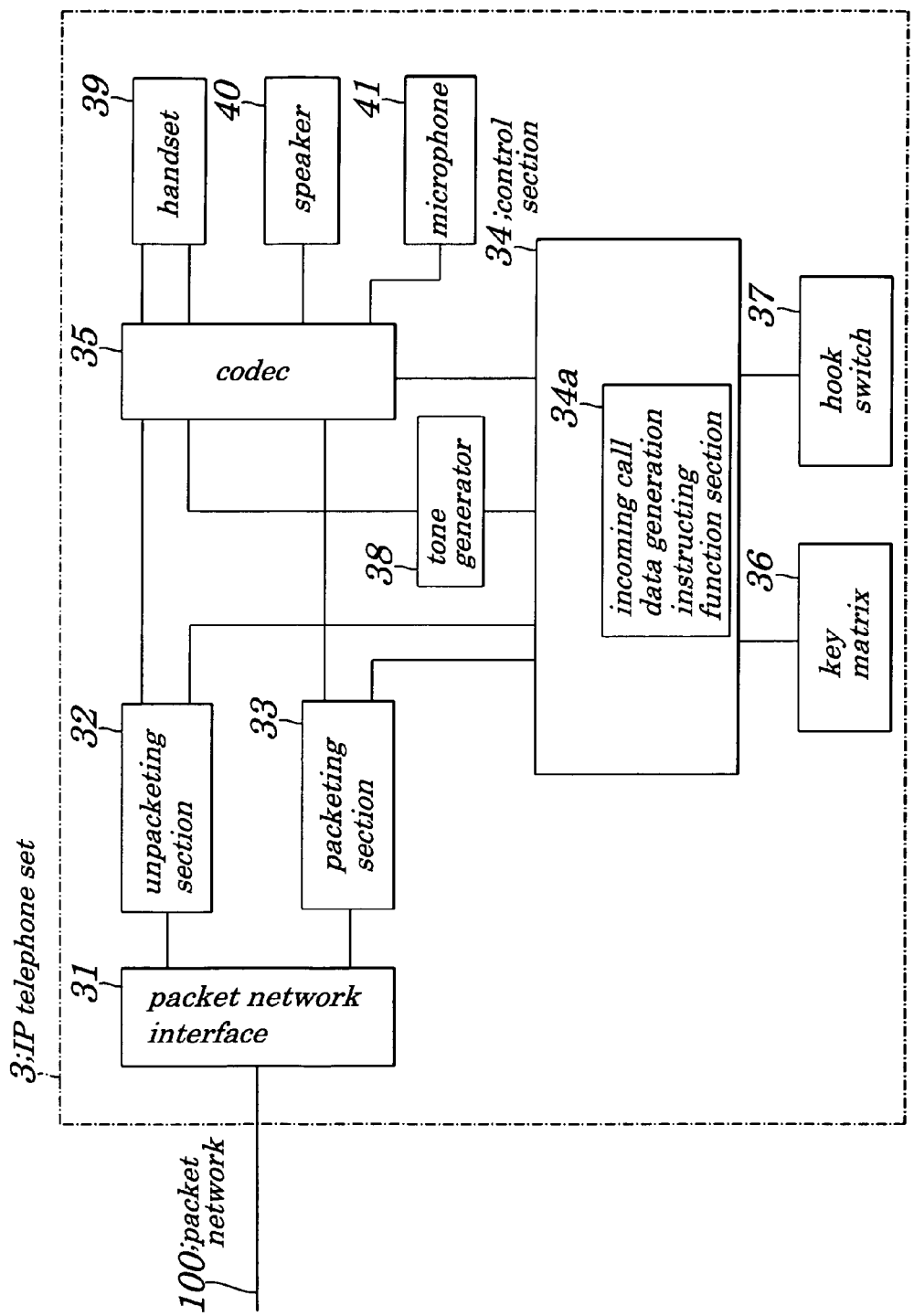

[FIG.4]
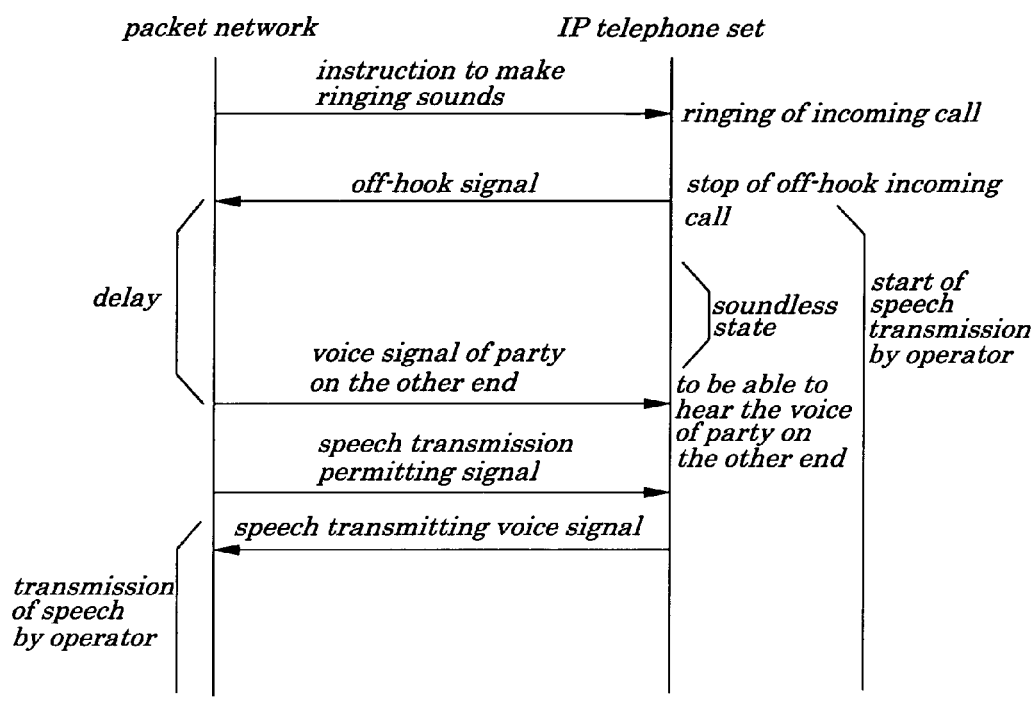

TELEPHONE SET AND RESPONSE METHOD TO INCOMING CALL

BACKGROUND OF THE INVENTION

1. Field of the Invention

The present invention relates to a telephone set and a method of a response to an incoming call and more particularly to an IP (Internet Protocol) telephone set used to pass a voice signal through a packet network using an internet protocol.

The present application claims priority of Japanese Patent Application No. 2000-145818 filed on May 18, 2000, which is hereby incorporated by reference.

2. Description of the Related Art

In a conventional IP telephone set to pass a voice signal through a packet transmission path using an internet protocol, when a handset is put in an off-hook state or when a monitor of a speaker is turned ON in order to make a response to an incoming call, a signal representing a state change caused by the above operations is transmitted to a network and, in response to this signal, packet data of a voice of a party on the other end is transmitted from the network to a user as a voice. Moreover, the user, after having obtained an instruction transmitted from the network, sends out his/her voice to allow transmission of a speech to the network.

FIG. 3 is a schematic block diagram showing configurations of the conventional IP telephone set. In FIG. 3, an IP telephone set 3 includes a packet network interface 31 used to transmit and receive a packet signal from and to a packet network 100, an unpacketing section 32 used to take out signal receipt controlling data and voice receiving data from a received packet, a packeting section 33 used to packet signal transmission controlling data and voice transmission data, a control section 34 to control a telephone on a whole, a codec 35 used to convert digital voice receiving data into analog voice receiving data and to convert analog voice transmission data to digital voice transmission data, a tone generator 38 used to generate various digital signal voices, a key matrix 36 used to detect key operations of the user, a hook switch 37, a handset 39 used to input and output receiving and transmitting voices, a speaker 40 used to amplify receiving voices and a microphone 41 used to input transmitting voices.

The packet network interface 31 is connected to the packet network 100, the unpacketing section 32 and the packeting section 33. The unpacketing section 32 is connected to the control section 34 and the codec 35. The packeting section 33 is connected to the control section 34 and the codec 35. The key matrix 36 and the hook switch 37 are connected to the control section 34. The tone generator 38 is connected to the control section 34 and the codec 35. The handset 39, speaker 40 and microphone 41 are connected to the codec 35.

FIG. 4 is a diagram showing a control signal sequence at the time of the response to the incoming call in the IP telephone set 3 and the packet network 100. Operations at the time of the response to the incoming call in the IP telephone set 3 and the packet network 100 will be described by referring to FIG. 3 and FIG. 4.

When an instruction to make ringing sounds is transmitted from the packet network 100 to the IP telephone set 3, the instruction is received by the packet network interface 31 and data on the instruction to make ringing sounds is taken out by the unpacketing section 32 from received packets and is transmitted to the control section 34.

An incoming call data generation instructing function section 34a in the control section 34 instructs the tone generator 38 to generate incoming call data and instructs the codec 35 to convert the incoming call data fed from the tone generator 38 into analog incoming call data and to transmit it to the speaker 40. The incoming call data generated by the tone generator 38 is converted into analog signals by the codec 35 and is transmitted as the incoming call from the speaker 40.

The user having confirmed the incoming call puts the handset 39 in an off-hook state. A result of the off-hook operation of the user is transmitted to the hook switch 37 and is detected by the control section 34. The control section 34, when detecting the off-hook operation, instructs the tone generator 38 and the codec 35 to stop the transmission of the incoming call and, at the same time, generates an off-hook signal and transmits the generated signal to the pocketing section 33. The off-hook signal is incorporated into the packet to be transmitted in the pocketing section 33 and is transmitted to the packet network 100 from the packet network interface 31.

From this point, the IP telephone set 3 becomes soundless. Moreover, even if the user starts the transmission of speech signals following the off-hook operation, since the IP telephone set 3 is not prepared for the speech transmission, the transmitting voice is not transmitted to the packet network 100.

Though a voice signal of the party on the other end is transmitted as a response to the off-hook signal from the packet network 100, a delay caused by a traffic in the packet network 100 develops. During this time, a soundless state continues.

When a voice signal of the party on the other end is transmitted from the packet network 100, the voice signal is received by the packet network interface 31 and the voice signal of the party on the other end is taken out from received packets by the unpacketing section 32 and is transmitted to the codec 35. The codec 35 converts the voice signal of the party on the other end into analog voice signals and a voice receiving section (not shown) of the handset 39 transmits the converted voice signal to the user, thus enabling the user to hear the voice of the party on the other end.

When a speech transmission permitting signal is transmitted as a response to the off-hook signal from the packet network 100, the a speech transmission permitting signal is received by the packet network interface 31 and the speech transmission permitting signal is taken out from received packets by the unpacketing section 32 and is transmitted to the control section 34.

The control section 34, when having received the speech transmission permitting signal, instructs the codec 35 to transmit the transmitting voice of the user which has been input from a transmitting section (not shown) of the handset 39. In the codec 35, the analog transmitting voice fed from the handset 39 is converted into digital transmitting data and is then transmitted to the packeting section 33. The transmitting data is incorporated in the packet to be transmitted by the packeting section 33 and is transmitted as the speech transmitting voice signal, from the packet network interface 31 to the packet network 100.

The conventional IP telephone set has a problem in that, an arrival of the voice of the party on the other end, in response to the off-hook operation at the time of the incoming call, is delayed due to a traffic condition in the packet network and, during the delay, the user, though having put the IP telephone set in the off-hook state, does not hear the voice of the party on the other end and the IP telephone becomes soundless, thus causing the user to have the distrust in operations of the IP telephone set.

The conventional IP telephone set has another problem in that, an arrival of the speech transmission permitting signal, in response to the off-hook operation at the time of the response to incoming calls, is delayed due to traffic conditions in the packet network and, during the delay, even if the user starts the transmission of speech following the off-hook operation, speech is not transmitted to the party of the other end, thus making it difficult to adjust the timing of starting the transmission of speech.

SUMMARY OF THE INVENTION

In view of the above, it is an object of the present invention to provide a telephone set and a method of a response to an incoming call which can prevent a user from having a distrust in operations of the telephone set and can prevent missing of a head of transmitted speech and can provide operability that can make the user be free from stresses.

According to a first aspect of the present invention, there is provided a telephone set including:

a notifying/instructing unit used to make an instruction to continuously notify to outside that an awaiting state is kept at a time of a response to an incoming call until a voice of a party on the other end is heard.

In the foregoing, a preferable mode is one wherein the notifying/instructing unit is used to make an instruction to transmit a predetermined signal voice and to continuously notify that the awaiting state is kept until the voice of the party on the other end is heard.

Also, a preferable mode is one wherein includes a unit used to generate the predetermined signal voice, a tone generator.

Also, a preferable mode is one wherein the notifying/instructing unit is used to make an instruction to transmit a predetermined display signal and to continuously notify that the awaiting state is kept until the voice of the party on the other end is heard.

Also, a preferable mode is one that wherein includes a unit used to generate the predetermined display signal.

Also, a preferable mode is one wherein the notifying/instructing unit, after having stopped the transmission of the incoming call at the time of the response to the incoming call, notifies continuously that the awaiting state is kept until the voice of the party on the other end is heard.

Also, a preferable mode is one wherein the notifying/instructing unit, after the transmission of the incoming call has been stopped by either an off-hook operation of a handset or a monitor-on operation of a speaker at the time of the response to the incoming call, continuously notifies that the awaiting state is kept until the voice of the party on the other end is heard.

Also, a preferable mode is one wherein the telephone set is used for an IP telephone set to transmit and receive a voice signal to and from a packet network using an internet protocol.

According to a second aspect of the present invention, there is provided a method of a response to an incoming call including:

a step of making an instruction to continuously notify to outside that an awaiting state is kept at a time of a response to the incoming call until a voice of a party on the other end is heard.

In the foregoing, a preferable mode is one that wherein includes a step of making an instruction to transmit a predetermined signal voice and to continuously notify that the awaiting state is kept until the voice of the party on the other end is heard.

Also, a preferable mode is one that wherein includes a step of instructing the predetermined signal voice to be transmitted to a unit used to generate the predetermined signal voice.

Also, a preferable mode is one that wherein includes a step of making an instruction to transmit a predetermined display signal and to continuously notify that the awaiting state is kept until the voice of the party on the other end is heard.

Also, a preferable mode is one that wherein includes a step of instructing a unit to generate the predetermined display signal to transmit the predetermined display signal.

Also, a preferable mode is one that wherein includes a step of continuously notifying, after having stopped the transmission of the incoming call at the time of the response to the incoming call, that the awaiting state is kept until the voice of the party on the other end is heard.

Also, a preferable mode is one that wherein includes a step of notifying continuously, after the transmission of the incoming call has been stopped by either an off-hook operation of a handset or a monitor-on operation of a speaker at the time of the response to the incoming call, that the awaiting state is kept until the voice of the party on the other end is heard.

Furthermore, a preferable mode is one that wherein includes a step of using a telephone set for IP telephone set to transmit and receive a voice signal to and from a packet network using an internet protocol.

With the above configurations, by using a tone generator mounted within the IP telephone set, the signal voice is continuously generated subsequent to the stop of incoming calls after the off-hook operation to continue to have the user hear until both the voice signal of the party on the other end and the speech transmission permitting signal are received from the packet network. Here, though the user expects to receive the voice of the party on the other end, by the off-hook operation, at the time of the response to incoming calls or expects that the transmission starts immediately after the off-hook operation, the situation that the user expects cannot occur due to the delay in the packet network. By using the tone generator embedded in the IP telephone set, the user hears the signal voice notifying the awaiting state and continues to hear the signal voice until receiving and transmitting of speech is made possible. The user, while hearing the signal voice notifying the awaiting state from the IP telephone set, recognizes that the delay has developed on the packet network side and waits until the occurrence of the signal voice notifying the awaiting state is stopped and then starts the speech communication with the party on the other end. This enables a soundless state and a speech disabled period caused by the delay in the packet network in the off-hook operation at the time of the response to incoming calls to be transmitted using the signal voice to the user. As a result, the user can recognize continuation and termination of these periods. Thus, the awaiting state is notified continuously to outside until the voice of the party on the other end is heard at the time of the response to the incoming call and, therefore, missing of the transmitted speech can be prevented without causing the user to have a distrust in operations of the telephone set and operability that makes the user be free from stresses can be provided.

BRIEF DESCRIPTION OF THE DRAWINGS

The above and other objects, advantages, and features of the present invention will be more apparent from the following description taken in conjunction with the accompanying drawings in which:

FIG. 1 is a schematic block diagram showing configurations of an IP telephone set according to an embodiment of the present invention;

FIG. 2 is a diagram showing a control signal sequence at a time of a response to an incoming call in the IP telephone set and a packet network according to the embodiment of the present invention;

FIG. 3 is a schematic block diagram showing configurations of a conventional IP telephone set; and FIG. 4 is a diagram showing a control signal sequence at a time of a response to an incoming call in the conventional IP telephone set and a conventional packet network.

DETAILED DESCRIPTION OF THE PREFERRED EMBODIMENTS

Best modes of carrying out the present invention will be described in further detail using one embodiment with reference to the accompanying drawings.

Embodiment

FIG. 1 is a schematic block diagram showing configurations of an IP telephone set 1 according to an embodiment of the present invention. The IP telephone set 1 of the embodiment of the present invention includes a packet network interface 11 used to transmit or receive a packet signal to and from a packet network 100, an unpacketing section 12 to take out signal receipt controlling data and voice receiving data from the received packet signal, a packeting section 13 used to packet the signal transmission controlling data and voice transmission data, a control section 14 used to control the entire IP telephone set 1, a codec 15 used to convert digital voice receiving data into analog receiving voice signal and to convert an analog speech transmitting voice signal to digital voice transmission data, a tone generator 18 used to generate various digital signal voices, a key matrix 16 used to detect operations of a key of a user, a hook switch 17, a handset 19 used to input and output receiving and transmitting voices, a speaker 20 to amplify received voices and a microphone 21 used to input transmitting voices.

The packet network interface 11 is connected to the packet network 100, the unpacketing section 12 and the packeting section 13. The unpacketing section 12 is connected to the control section 14 and the codec 15. The packeting section 13 is connected to the control section 14 and the codec 15.

The key matrix 16 and the hook switch 17 are connected to the control section 14. The tone generator 18 is connected to the control section 14 and the codec 15. The handset 19, speaker 20, and microphone 21 are connected to the codec 15.

FIG. 2 is a diagram showing a control signal sequence at a time of a response to an incoming call in the IP telephone set 1 and a packet network 100 according to the embodiment of the present invention. Operations at the time of the response to the incoming call in the IP telephone set 1 and the packet network 100 will be described by referring to FIG. 1 and FIG. 2.

When an instruction to make ringing sounds is transmitted from the packet network 100 to the IP telephone set 1, the instruction is received by the packet network interface 11 and data on the instruction to make ringing sounds is taken out by the unpacketing section 12 from received packets and is transmitted to the control section 14. The control section 14, by using an incoming call data generation instructing function section 14a, instructs the tone generator 18 to generate incoming call data and also instructs the codec 15 to convert the incoming call data fed from the tone generator 18 into analog signals and to output it to the speaker 20.

The incoming call data generated by the tone generator 18 is converted into analog signals by the codec 15 and is transmitted as the incoming call from the speaker 20. The user, when confirming the incoming call data, puts the handset 19 into an off-hook state. Off-hook operation of the user is detected through the hook-switch 17 by the control section 14.

The control section 14, when detecting the off-hook operation, instructs the tone generator 18 and the codec 15 to stop the transmission of the incoming call and, at the same time, by using an awaiting voice generation instructing function section 14b, instructs the tone generator 18 to generate a signal voice informing an "awaiting state" and instructs the codec 15 to transmit the signal voice information to the handset 19.

At the same time, the control section 14 generates an off-hook signal and transmits it to the packeting section 13. The off-hook signal is incorporated in the packet to be transmitted by the packeting section 13 and is transmitted from the packet network interface 11 to the packet network 100. From this point, in the IP telephone set 1, a signal voice informing the awaiting state is generated continuously from the handset 19 and the user recognizes that a start of transmitting and receiving is delayed.

When a voice signal of a party on the other end is transmitted from the packet network 100, the signal is received by the packet network interface 11 and the voice signal of the party on the other end is taken out from the received packet by the unpacketing section 12 and is transmitted to the codec 15. The codec 15 converts voice data of the party on the other end to analog voice signals, mixes it with signal voices informing the awaiting state and transmits them through the voice receiving section (not shown) of the handset 19 to the user, thus making it possible for the user to hear the voice of the party on the other end.

When a speech transmission permitting signal is transmitted, in response to the off-hook signal, from the packet network 100, the speech is received by the packet network interface 11 and speech transmission permitting data is taken out from received packets by the unpacketing section 12 and is transmitted to the control section 14.

The control section 14, when receiving the speech transmission permitting signal, instructs the tone generator 18 to stop the generation of the signal voice informing the awaiting state and instructs the codec 15 to transmit the transmitting voice of the user, which has been input from the transmitting section (not shown) of the handset 19, to the packeting section 13. The codec 15 converts the analog transmitting voice fed from the handset 19 into the digital transmitting data and transmits it to the packeting section 13. The transmitting data is incorporated in the packet to be transmitted by the packeting section 13 and is transmitted as the speech transmitting voice signal from the packet network interface 11 to the packet network 100.

Thus, by informing the user of a delay occurring in the packet network 100 which is not visible, using a signal voice, the user who has heard by a signal voice at a time of the off-hook operation in response to the incoming call recognizes normal operations of the IP telephone set 1, which can prevent the user from having a distrust in operations of the IP telephone set 1.

Moreover, by informing the user of the delay occurring in the packet network 100 which is not visible, using the signal voice, the user who has heard the signal voice at a time of the off-hook operation, in response to the incoming call, recognizes normal operations of the IP telephone set 1 and starts transmission with timing in which the transmission is permitted, caused by the stop of signals, missing of a head of a transmitted speech can be prevented and operability that can make the user be free from stresses can be provided.

It is apparent that the present invention is not limited to the above embodiments but may be changed and modified without departing from the scope and spirit of the invention. For example, in the above embodiment, by causing the handset 19 to generate the signal voice, the user recognizes the awaiting state, however, the signal voice may be generated by using not the handset 19 but the speaker 20. A lamp on the IP telephone set 1 or a liquid crystal board (not shown), instead of the signal voice, may be used to have the user recognize the awaiting state. A frequency, timbre, voice, light-emitting substance may be employed as means to inform the awaiting state. Communication method other than the packet network 100 may be used in the method. Moreover, in the embodiment, speech operation using the handset 19 is provided, however, a hand-free speech operation using the microphone 21 embedded in the IP telephone set 1 or the speaker 20 may be used or a head set (not shown) may be used instead of the handset 19.

What is claimed is:

1. A telephone set comprising:
   at least one handset, and
   a notifying/instructing unit used to make an instruction to continuously notify a user via a voice receiving section of said handset that an awaiting state is kept at a time of a response to an incoming call until a voice of a party placing said call is heard through said voice receiving section of said handset wherein said waiting state is a time period between the detection of an off-hook signal and when the user is able to hear the voice of a caller.

2. The telephone set according to claim 1, wherein said notifying/instructing unit is used to make an instruction to transmit a predetermined signal voice and to continuously notify said user that said awaiting state is kept until said voice of said party placing said call is heard.

3. The telephone set according to claim 2, further comprising a unit used to generate said predetermined signal voice.

4. The telephone set according to claim 1, wherein said notifying/instructing unit is used to make an instruction to transmit a predetermined display signal and to continuously notify said user that said awaiting state is kept until said voice of said party placing said call is heard.

5. The telephone set according to claim 4, further comprising a unit used to generate said predetermined display signal.

6. The telephone set according to claim 1, wherein said notifying/instructing unit, after having stopped transmission of said incoming call at said time of said response to said incoming call, notifies said user continuously that said awaiting state is kept until said voice of said party placing said call is heard.

7. The telephone set according to claim 6, wherein said notifying/instructing unit, after said transmission of said incoming call has been stopped by an off hook operation of said handset at said time of said response to said incoming call, continuously notifies said user that said awaiting state is kept until said voice of said party placing said call is heard.

8. The telephone set according to claim 1, wherein said telephone set is used for an internet protocol telephone set to transmit and receive a voice signal to and from a packet network using an internet protocol.

9. A method of a response to an incoming call via a telephone set comprising:
   receiving a call through a handset; and
   instructing said telephone set to continuously notify a user via a voice receiving section of said handset of an awaiting state until a voice of a party placing said call is heard wherein said waiting state is a time period between the detection of an off-hook signal and when the user is able to hear the voice of a caller.

10. The method of the response to the incoming call according to claim 9, further comprising a step of making an instruction to transmit a predetermined signal voice and to continuously notify said user that said awaiting state is kept until said voice of said party placing said call is heard.

11. The method of the response to the incoming call according to claim 10, further comprising a step of instructing said predetermined signal voice to be transmitted to a unit used to generate said predetermined signal voice.

12. The method of the response to the incoming call according to claim 9, further comprising a step of making an instruction to transmit a predetermined display signal and to continuously notify said user that said awaiting state is kept until said voice of said party placing said call is heard.

13. The method of the response to the incoming call according to claim 12, further comprising a step of instructing a unit to generate said predetermined display signal to transmit said predetermined display signal.

14. The method of the response to the incoming call according to claim 9, further comprising a step of continuously notifying said user, after having stopped a transmission of said incoming call at said time of said response to said incoming call, that said awaiting state is kept until said voice of said party placing said call is heard.

15. The method of the response to the incoming call according to claim 14, further comprising a step of notifying said user continuously, after said transmission of said incoming call has been stopped by an off-hook operation of said handset at said time of said response to said incoming call, that said awaiting state is kept until said voice of said party placing said call is heard.

16. The method of the response to the incoming call according to claim 9, further comprising a step of using said telephone set for an internet protocol telephone set to transmit and receive a voice signal to and from a packet network using an internet protocol.

* * * * *